Figure 21:
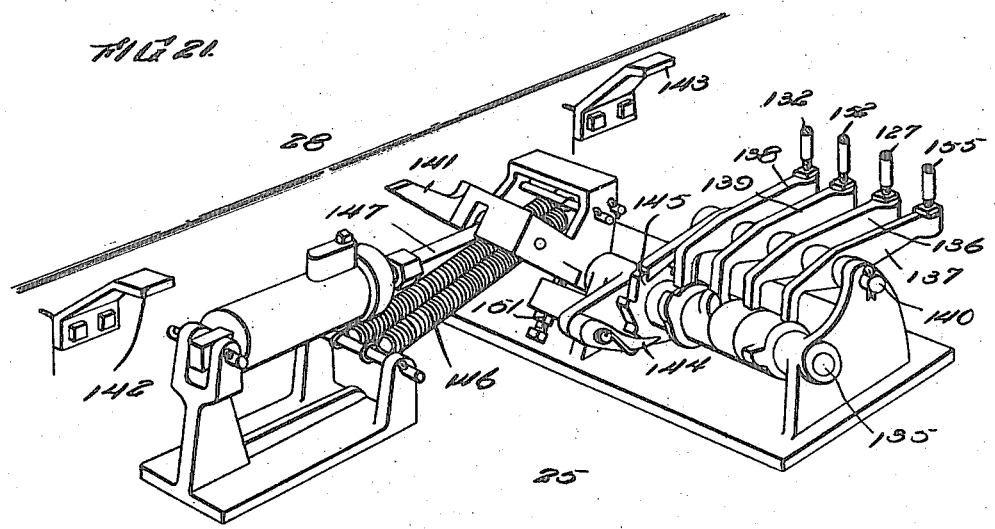

C. F. BURKHART.
SHOE DRESSING MACHINE.
APPLICATION FILED JAN. 12, 1916.
1,196,659.
Patented Aug. 29, 1916.
10 SHEETS—SHEET 1.
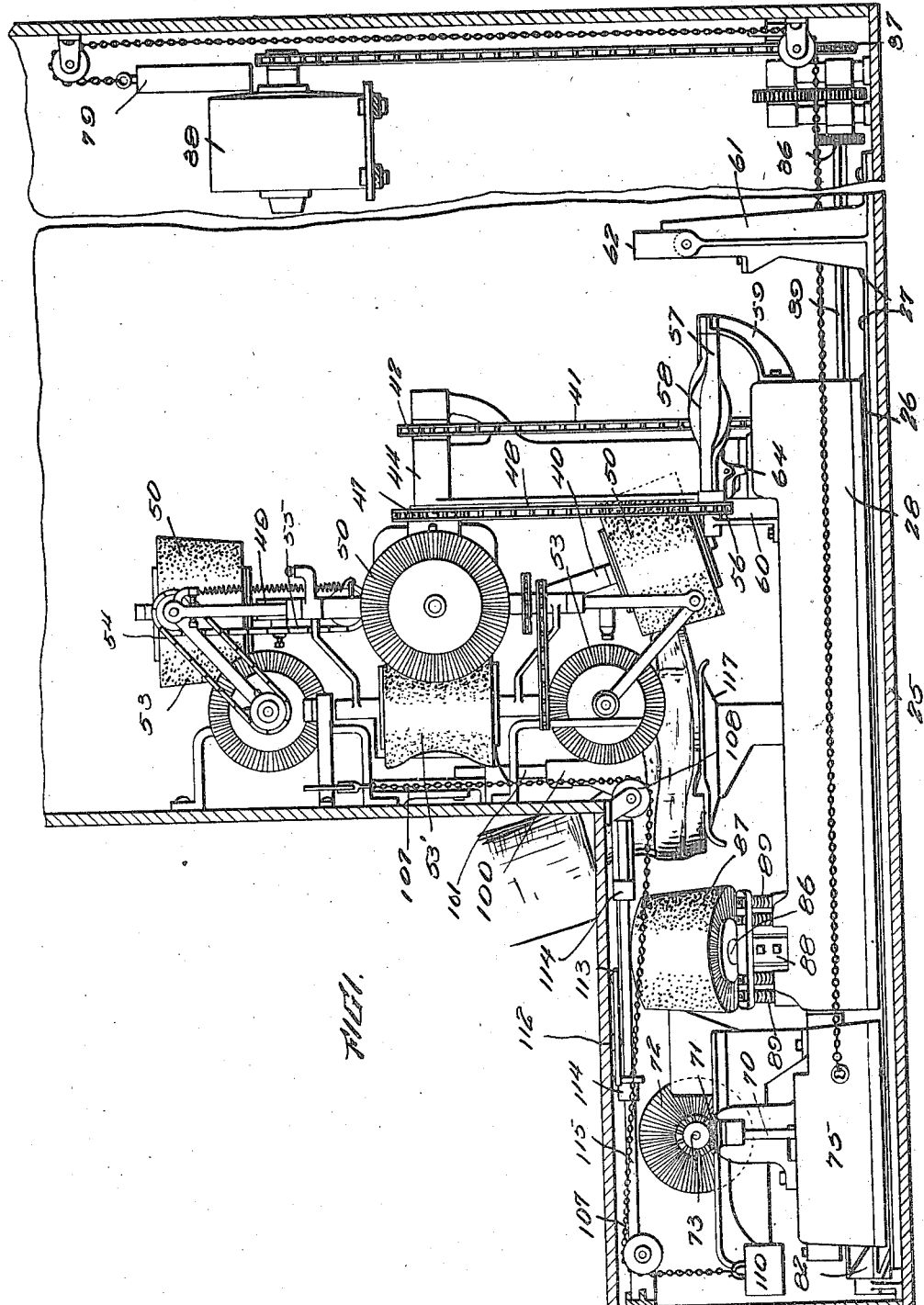
Charles F. Burkhart, Inventor

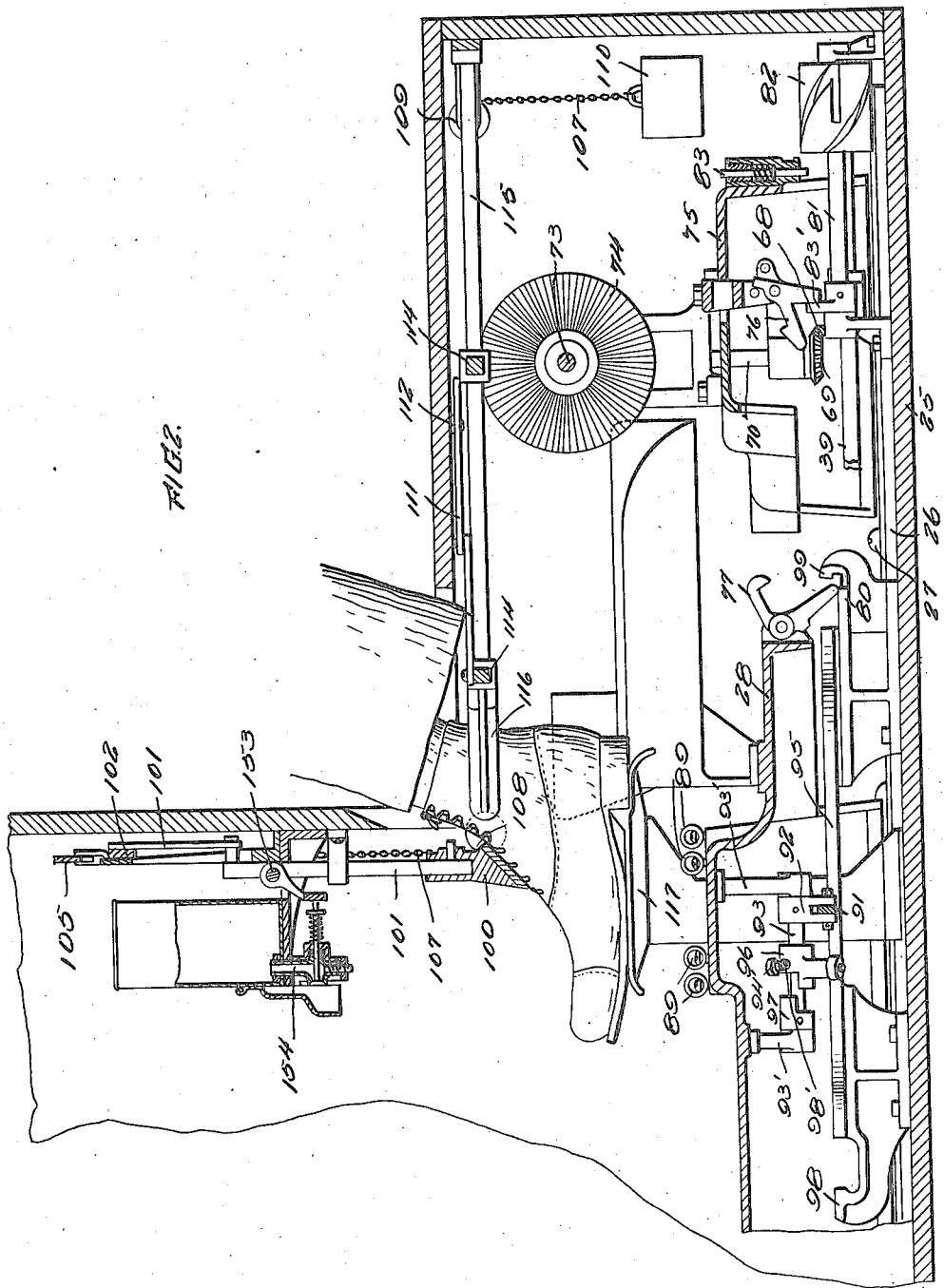

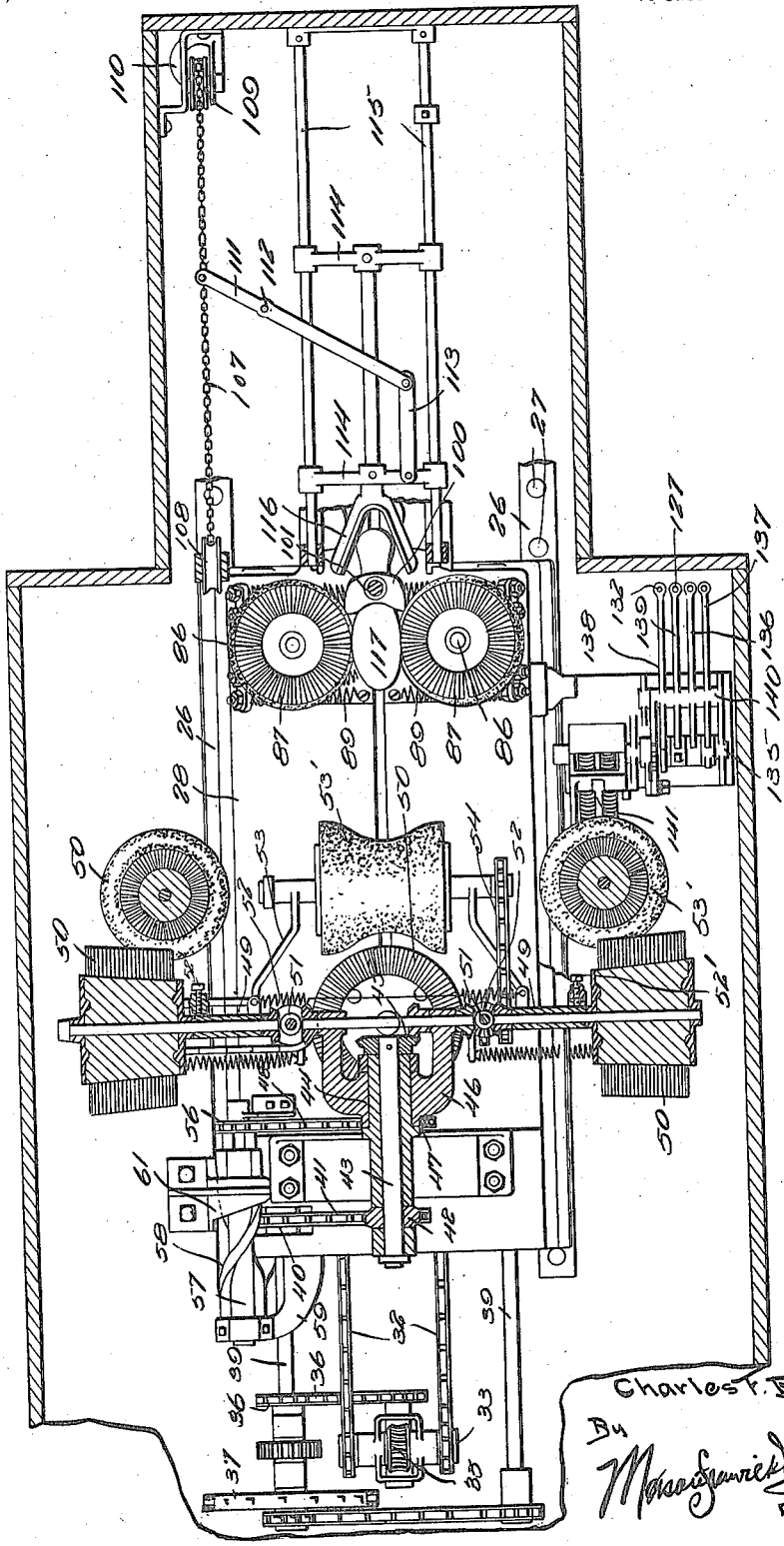

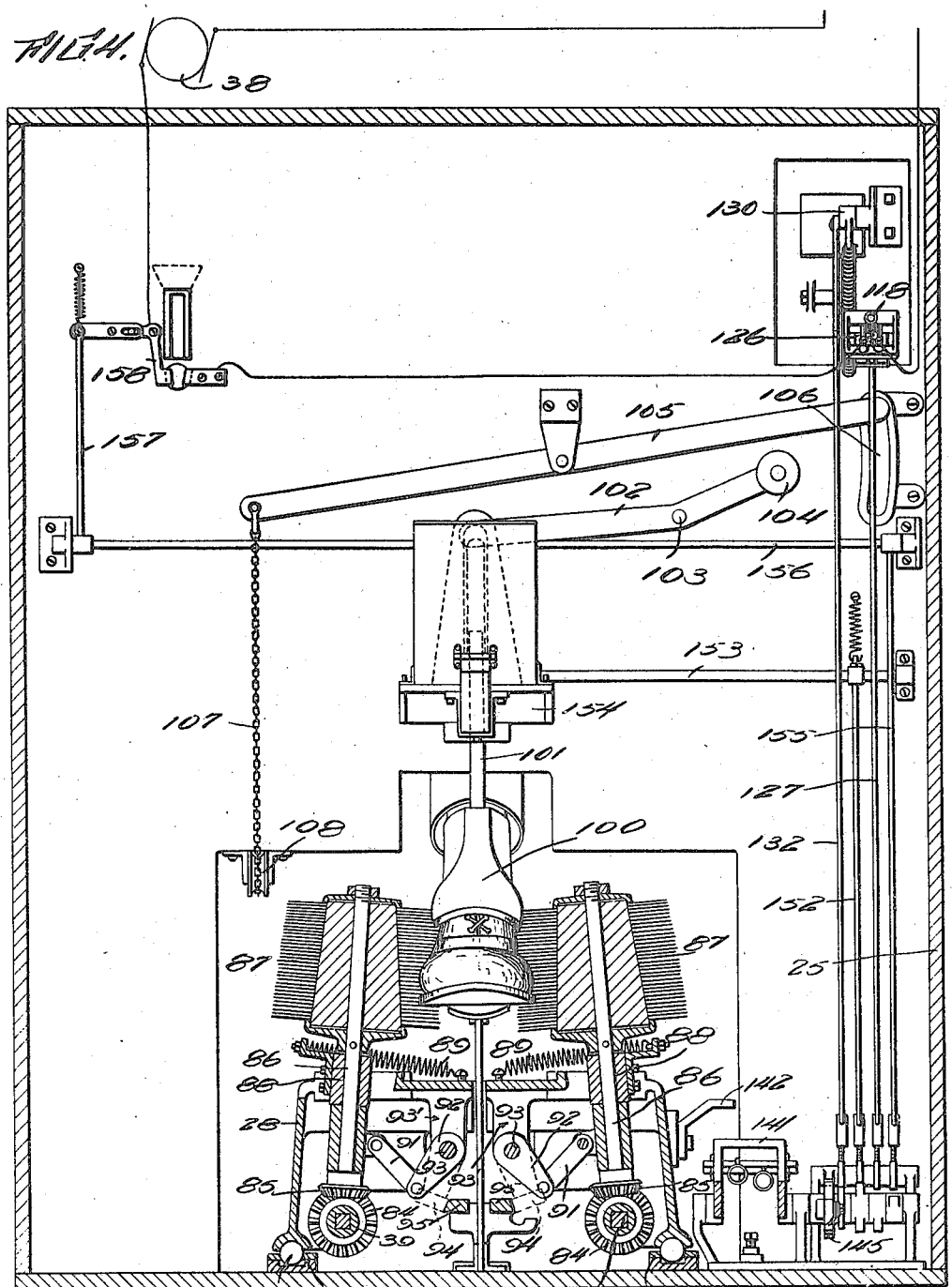

C. F. BURKHART.
SHOE DRESSING MACHINE.
APPLICATION FILED JAN. 12, 1916.
1,196,659.
Patented Aug. 29, 1916.
10 SHEETS—SHEET 5.
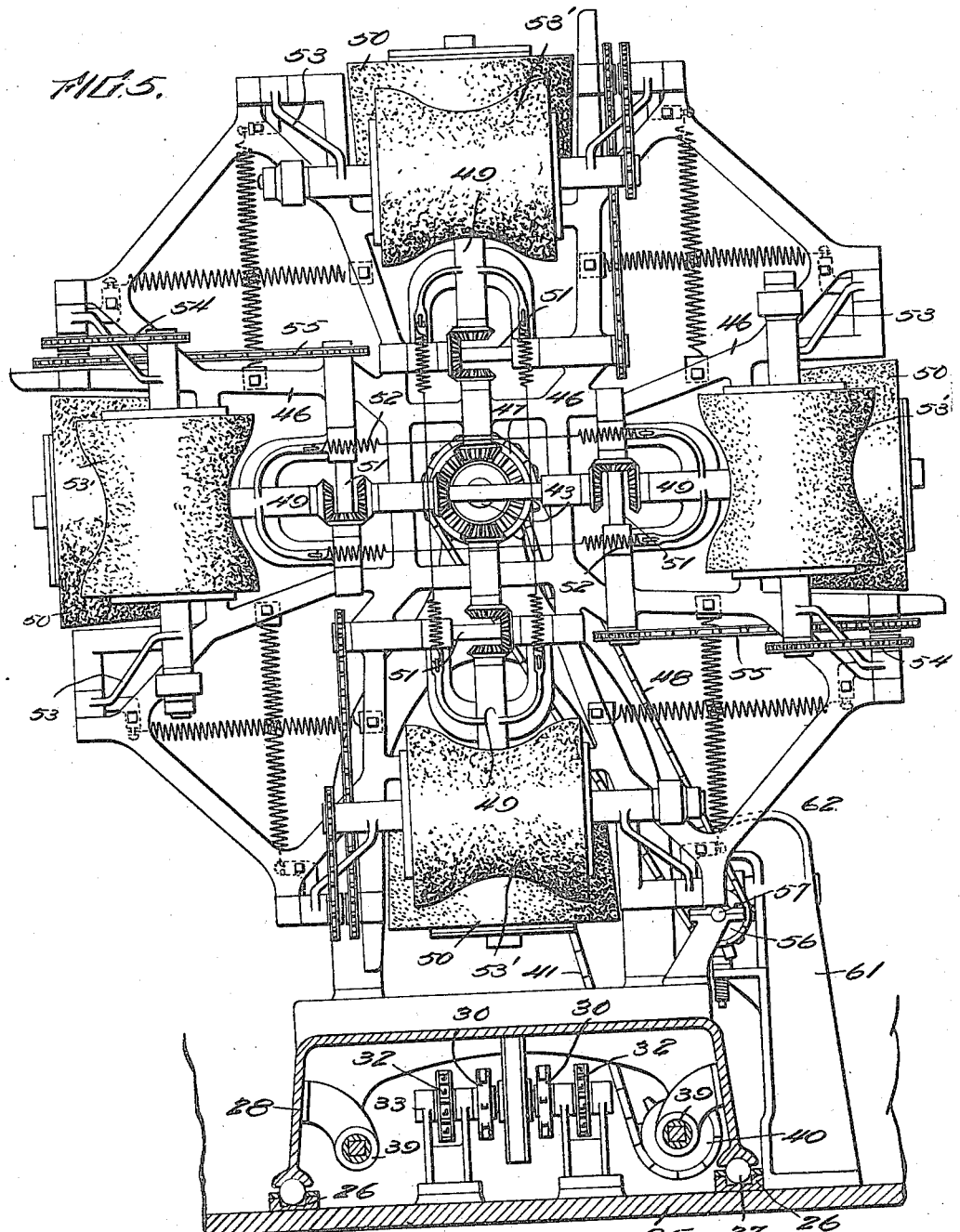

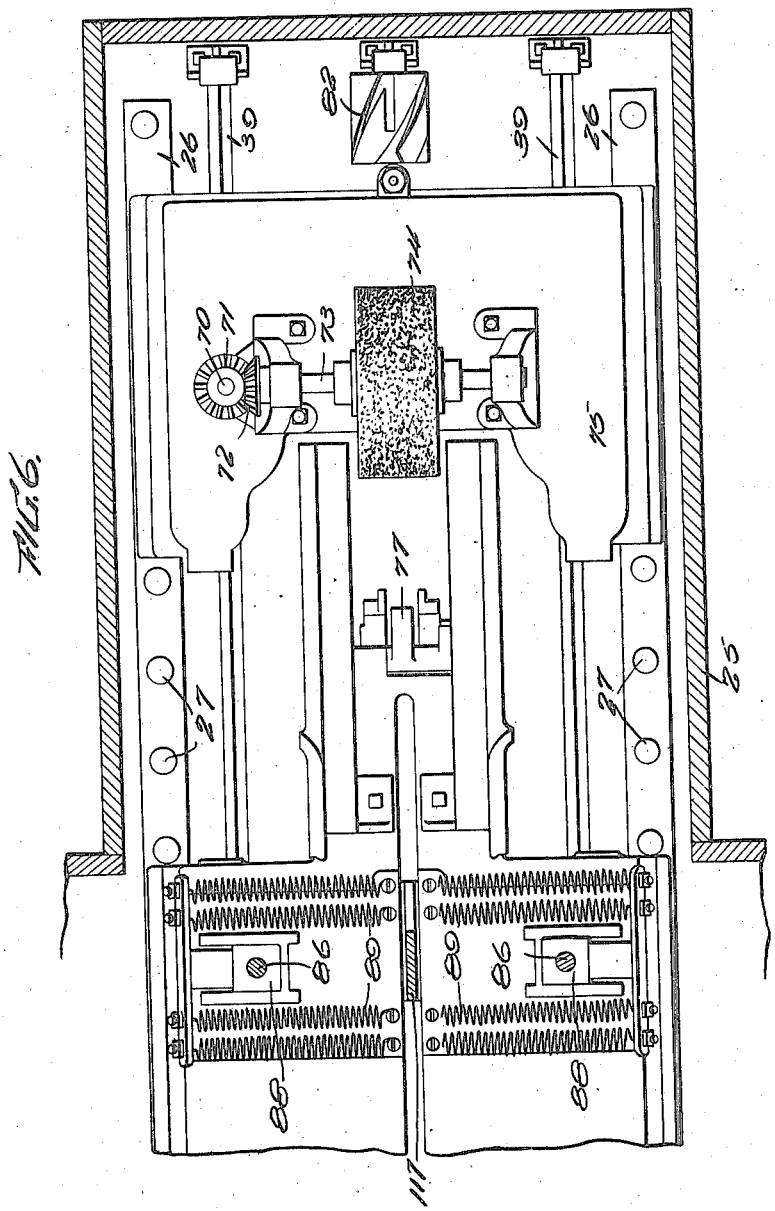

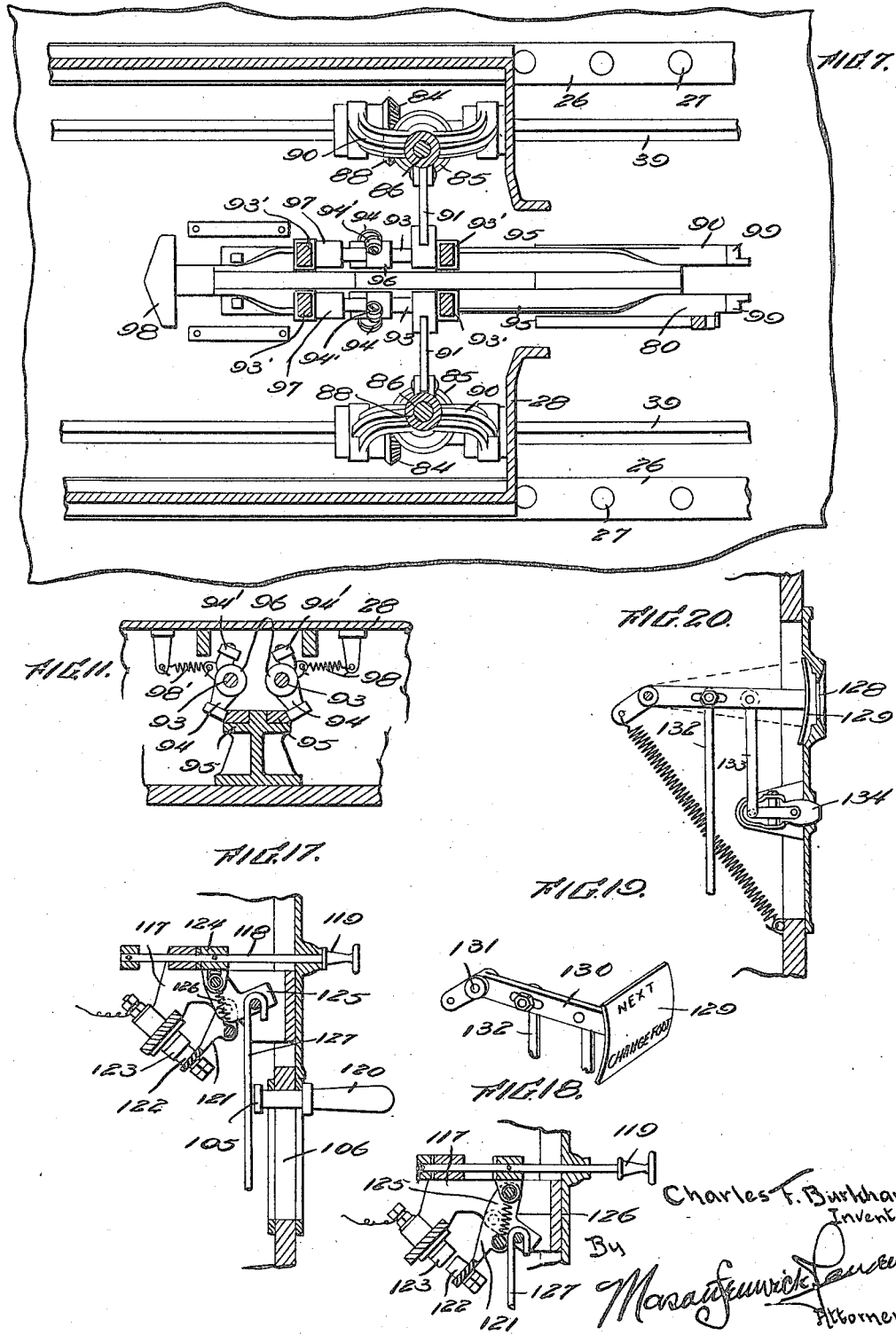

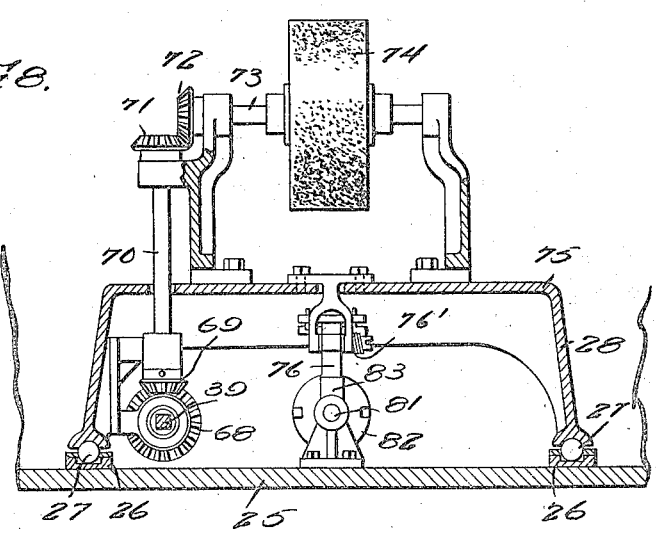
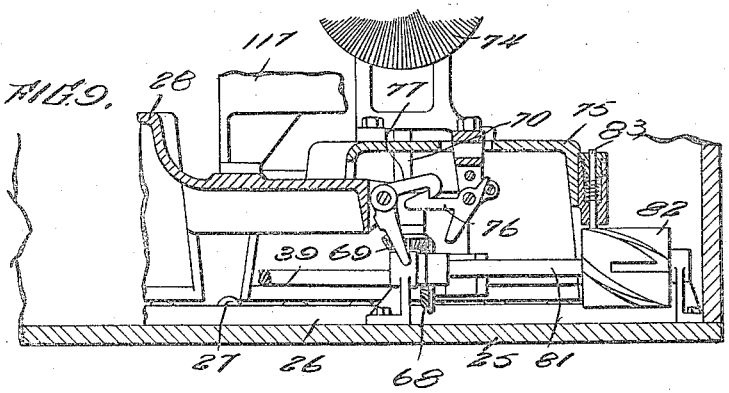
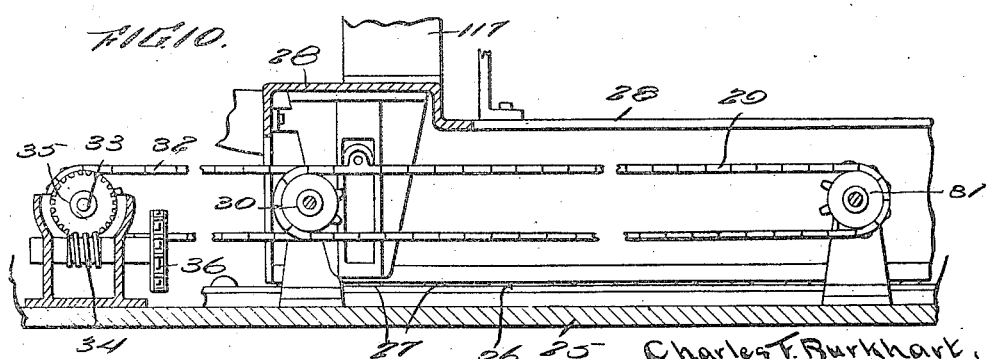

C. F. BURKHART.
SHOE DRESSING MACHINE.
APPLICATION FILED JAN. 12, 1916.
1,196,659.
Patented Aug. 29, 1916.
10 SHEETS—SHEET 9.
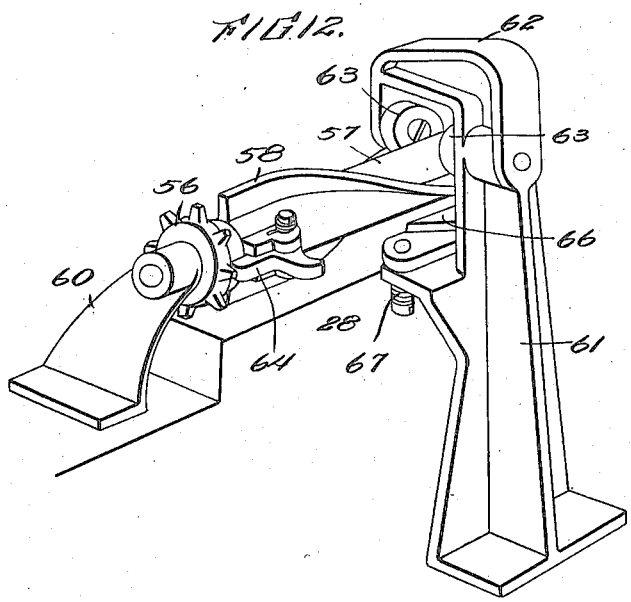
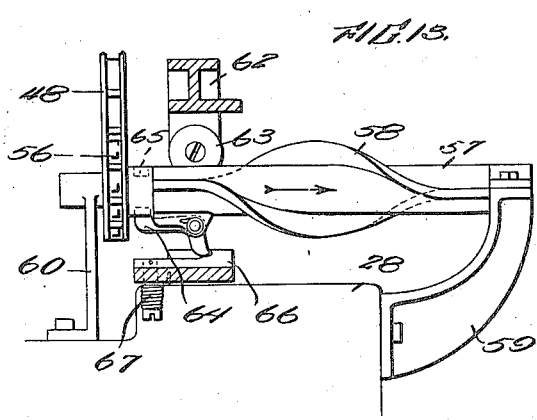
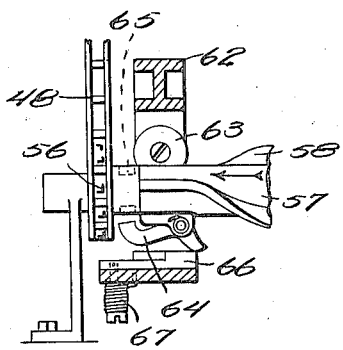
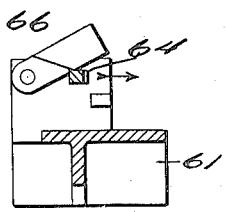
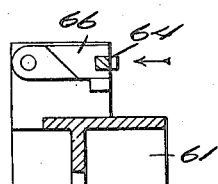
Charles F. Burkhart, Inventor.

C. F. BURKHART.
SHOE DRESSING MACHINE.
APPLICATION FILED JAN. 12, 1916.

1,196,659.

Patented Aug. 29, 1916.
10 SHEETS—SHEET 10.

Charles F. Burkhart
Inventor

By Mason Fenwick Lawrence
Attorney

UNITED STATES PATENT OFFICE.

CHARLES F. BURKHART, OF PHILADELPHIA, PENNSYLVANIA, ASSIGNOR TO BURKHART CORPORATION, A CORPORATION OF NEW YORK.

SHOE-DRESSING MACHINE.

1,196,659.

Specification of Letters Patent.

Patented Aug. 29, 1916.

Substitute for application Serial No. 604,408, filed January 24, 1911. This application filed January 12, 1916. Serial No. 71,742.

*To all whom it may concern:*

Be it known that I, CHARLES F. BURKHART, a citizen of the United States, residing at Philadelphia, in the county of Philadelphia and State of Pennsylvania, have invented certain new and useful Improvements in Shoe-Dressing Machines; and I do hereby declare the following to be a full, clear, and exact description of the invention, such as will enable others skilled in the art to which it appertains to make and use the same.

This invention relates to shoe dressing machines, and is a substitute for application Serial Number 604,408, filed January 24, 1911, from which was divided out application Serial No. 751,604, filed March 5, 1913, renewed as Serial No. 34,966, filed June 18, 1915, patented March 21, 1916, No. 1,176,700.

An object of the invention is to provide improved means for driving the frame which carries the several brushes performing the cleaning and polishing operations upon the front and top of the shoe.

A further object of the invention is to provide improved timing mechanism for carrying into effect simultaneously and synchronously the several operations of the machine.

A further object of the invention is to provide improved positioning and shielding means for positioning and guarding the shoe and foot of the operator against displacement and undesired application of the dressing.

A further object of the invention is to provide improved mechanism for holding the side brushes in and out of operative relation with the sides of the shoe being operated upon.

A further object of the invention is to provide improved means for locking the front and rear carriages to move in unison and to unlock such carriages at predetermined timed intervals to permit such carriages to operate for a limited period independently of each other.

A further object of the invention is to provide improved means actuated from the timing mechanism for changing the switch which controls the supply of current to the motor and also for changing a recording mechanism and means for advising the party being operated upon of the next move to be made on his part.

With these and other objects in view the invention comprises certain novel constructions, combinations and arrangement of parts as will be hereinafter more fully described and claimed.

In the drawings: Figure 1 is a view of the improved polishing mechanism with the side of the casing removed, such mechanism being seen in side elevation. Fig. 2 is a view similar to Fig. 1 seen from the opposite side and with parts of the mechanism broken away showing the foot positioning and shielding means. Fig. 3 is a top plan view of the carriage with the operating frame and brushes sectioned on the line of its axis. Fig. 4 is a transverse sectional view diametrically through the side brushes. Fig. 5 is a view in front elevation of the main frame carrying the brushes designed to operate upon the top and front of the shoe. Fig. 6 is a top plan view of the carriages showing the heel operating brush and the mechanism for holding the side brushes in engagement with the sides of the shoe. Fig. 7 is a horizontal longitudinal section on a plane lower than the section of Fig. 6 showing the means for operating the side brushes and for moving them into and out of engagement with the shoe. Fig. 8 is a transverse sectional view through the carriage showing the heel brush in front elevation. Fig. 9 is a longitudinal sectional detail view showing the means for locking the front and rear carriage together. Fig. 10 is a longitudinal sectional view showing the means for reciprocating the carriage. Fig. 11 is a detail sectional view showing the means for moving the side brushes into and out of operative relation with the shoe. Fig. 12 is a detail perspective view of the mechanism for transmitting power to rotate the brush carrying main frame. Fig. 13 is a detail view in side elevation with the brackets broken away showing the operating mechanism as at Fig. 12. Fig. 14 is a view similar to Fig. 13 with the clutch released. Fig. 15 is a view in top plan of the clutch operating device swung out of operative position. Fig. 16 is a top plan view of the clutch operating device swung into operative position. Fig.

Figure 22:
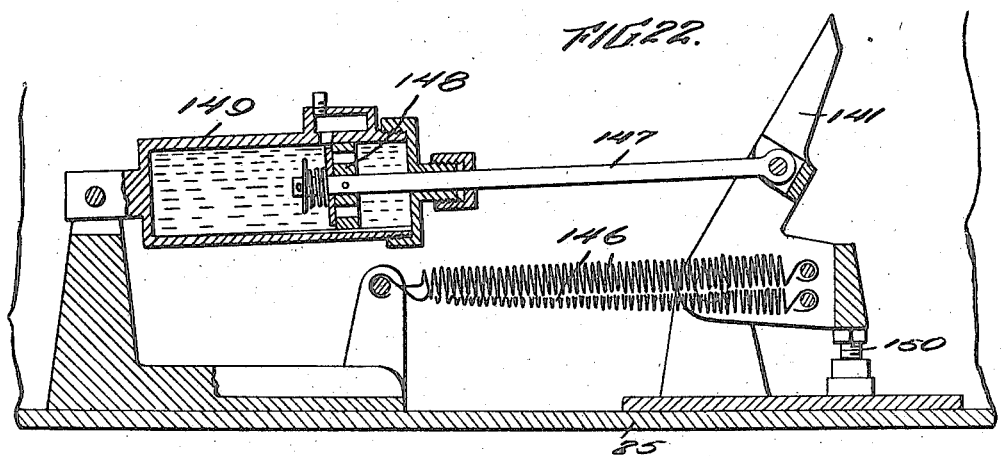
Figure 23:
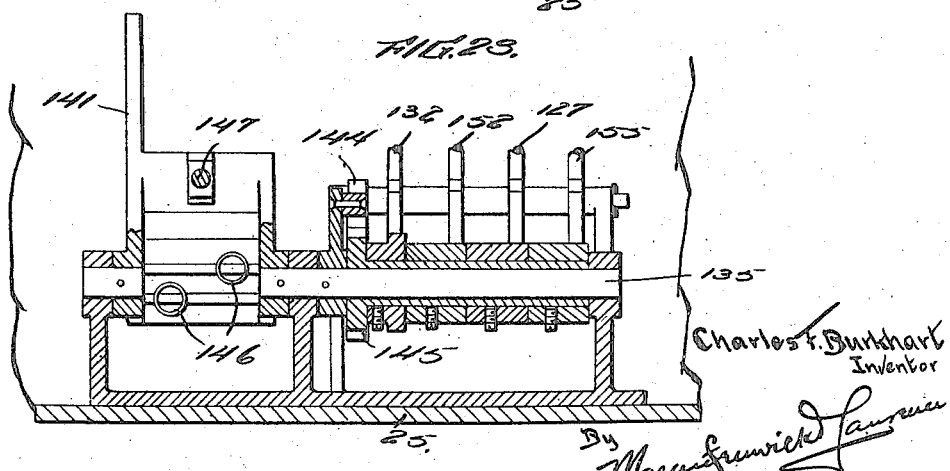

17 is a view of the push switch closed. Fig. 18 is a view of the push switch open. Fig. 19 is a perspective view of the structure carrying the changeable notice. Fig. 20 is a view in vertical detail section of the notice carrying device. Fig. 21 is a view in perspective of the general timing mechanism. Fig. 22 is a detail sectional view of the dash-pot and lever of the timing mechanism. Fig. 23 is a transverse sectional view through the cam shaft of the timing mechanism.

Like characters of reference indicate corresponding parts throughout the several views.

As in the aforesaid co-pending applications the present invention comprises a base or frame 25 in the form of a housing and flooring which contains and incloses the entire mechanism.

Upon the floor of the frame or housing 25 are tracks 26 provided with any approved friction reducing means as the balls 27 upon which is mounted to reciprocate a carriage 28. The carriage 28 is reciprocated in any approved manner as by means of sprocket chains 29 passing over sprockets 30 and 31 and driven by other sprocket chains 32 receiving motion from the drive shaft 33 which in turn receives motion through the agency of the worm 34 and gear 35 from another sprocket chain 36 receiving motion from the main sprocket 37 from the motor 38. Motion from the sprocket 37 is also transmitted to the squared or multi-angular shafts 39 which extend longitudinally throughout the greater portion of the length of the machine.

The carriage 28 carries a sprocket 40 mounted to slide longitudinally upon one of the shafts 39 and over such sprocket passes a sprocket chain 41 which in turn passes over a sprocket 42 upon the shaft 43 which is journaled in a bearing 44 and carries a bevel pinion 45 for driving the several brushes. Mounted also upon the bearing 44 is the frame 46 provided with a sprocket 47 accommodating a sprocket chain 48.

The frame 46 provides bearings as at 49 for the brushes 50, such bearings 49 being pivotally connected with the frame by means of drive shafts 51 to permit the movement of such brushes in a plane parallel with the driving shaft 43 and held in operative position by means of springs 52, with adjusting bolts 52' for limiting the return movement.

The frame 46 also provides bearings for the auxiliary frames 53 which carry brushes 53' and the latter receive motion by means of sprocket chains 54 and 55 from the drive shafts 51. The main frame, auxiliary frames, mounting of the brushes and driving such brushes is substantially similar to the same features disclosed in said co-pending application 428,187, and need no further description here.

To rotate the frame 46 and therewith the brushes carried thereby to change the brushes operating upon the foot, the chain 48, which connects with the sprocket 47 of such frame, passes also over a sprocket 56 carried upon a shaft 57 which carries spiral or helical fins 58. The shaft 57 is journaled in brackets 59 and 60 mounted upon the carriage 28 and reciprocating therewith.

Adjacent the path of movement of the carriage a pillar 61 is erected having a U-shaped top portion 62 carrying two rollers 63 disposed upon opposite sides of the shaft 57 and in position to ride along the tops of the helical fins 58. The result of such action is that as the shaft 57 reciprocates beneath such rollers 63 it is alternately rotated through half a circumference and return. The shaft 57 carries a detent 64 positioned to engage sockets 65 in the hub of the sprocket 56 to lock the shaft 57 and the hub to rotate together. The pillar 61 carries a block 66 in such position that in passing in the direction indicated by the arrow in Fig. 13 the detent 64 will move the block 66 outwardly against the tension of its spring 67 to permit such detent to pass without being unseated from the socket 65. During such motion the shaft 57 and sprocket 56 are locked together so that the one-half rotary movement imparted to the shaft 57 by the rollers 63 is also imparted to the sprocket 56 and through the medium of the chain 48 to the sprocket 47 and frame 46. The sprocket 47 is provided with twice as many teeth as the sprocket 56 so that one-half revolution of the sprocket 56 rotates the sprocket 47 and the frame 46 one-quarter of a revolution to bring the next set of brushes carried by said frame into operative relation with the shoe rest and shoe being operated upon. Upon the return movement of the carriage the detent 64 strikes the square end of the block 66 thereby disengaging it from the hub of the sprocket 56 and permitting the return movement without operating such sprocket. In this manner a rotary step by step movement is imparted to the main frame 46 one-quarter of a revolution at each reciprocation of the carriage 28.

A bevel gear 68 is also longitudinally slidably mounted upon one of the squared shafts 39 with a bevel pinion 69 intergeared therewith and rigidly secured to a shaft 70 which in turn is geared by means of spur pinions 71 and 72 with a shaft 73 carrying a heel brush 74.

All the mechanism just described including the bevel gear 68 and the brush 74 is mounted upon a rear carriage 75 which also travels upon the track 26 and balls 27. The carriage 75 is provided with a hooked detent 76 proportioned and positioned to engage with a hooked detent 77 carried by the carriage 28 both of such detents being spring pressed in such direction as to lock together thereby temporarily locking the two carriages to operate as a single carriage, the spring for the lever 76 being shown at 76' in Fig. 8 with a similar spring not shown for the lever 77. When the carriage 28 moves to the rear to the position shown at Fig. 9 such detents lock together and the carriage 75 is also moved yieldingly forward by means of a cable 78 passing over the required pulleys and attached to a weight 79 whereby such rear carriage 75 is held yieldingly in engagement with the heel of the shoe being operated upon. To permit of such yielding engagement the detent 77 in its forward movement engages a plate 80 which serves to lift said detent 77 and disengage it from the detent 76. In other words, at the beginning of travel of the carriage 75 and to provide positive movement therefor the carriage 28 is temporarily locked or connected with the carriage 75 and such carriages move forwardly together for a limited distance when the detent 77 is disengaged from the detent 76 permitting the carriage 75 to then be actuated solely by the weight 79.

During one reciprocation of the carriage 28 it is desirable that the carriage 75 remain stationary. For this purpose a shaft 81 is journaled centrally of the frame and provided with a cam head 82 having spiral or helical grooves formed in the surface thereof positioned to be engaged by a spring-pressed pawl 83 carried by the carriage 75 so that at each reciprocation of said carriage 75 the shaft 81 is rotated through one-quarter of a revolution. The shaft 81 carries a detent 83' in position to at times be raised into position to engage the detent 76 and to move such detent against the tension of its spring to throw such detent out of position to be engaged by the detent 77 so that during such period the carriage 75 does not move forward with the carriage 28 to a sufficient distance to engage the slot upon the foot rest but is in position to be engaged by the carriage 28 upon its return movement to move it backwardly to again rotate the shaft 81 one-quarter of a revolution. By this arrangement the heel brush 74 is applied to the heel of the shoe three times successively following the reciprocation of the carriage 28 but the fourth time the carriage 75 and the heel brush 74 remain out of engagement with the shoe. Carried also by the carriage 28 are gears 84 also longitudinally slidable upon the squared shafts 39 and intergeared with pinions 85 which in turn carry shafts 86 in their turn carrying side brushes 87.

The shafts 86 extend upwardly through laterally slidable bearing boxes 88 and the brushes 87 are held to their work by the springs 89. The shafts 86 are pivoted to oscillate upon the squared shafts 39 as a center by means of yokes 90, and are controlled in such swinging movement in one direction by the springs 89 and in the opposite direction by means of a toggle consisting of links 91 and the arms 92 rigidly secured to shafts 93.

The shafts 93 are journaled in brackets 93' and are controlled by means of levers 94 having rollers traveling along the sides of cam tracks 95 rigid with the base 25. The levers 94 are loosely mounted upon the shaft 93 and have halved hubs 96 adapted for clutch engagement with similar halved hubs 97 rigidly secured to the shafts 93. At one end an abutment 98 is erected in position to engage the rollers 99' on the levers 94 when they have passed off from engagement with the track 95 to move the hub 96 out of engagement with the hub 97. By this arrangement the shafts 86 are permitted to act under the tension of the springs 89 to hold the brushes 87 in operative engagement with the shoe during the movement of the brushes from the toe to the heel of the shoe. When the carriage has reached the limit of its movement in this direction the said rollers engage another abutment 99 which moves the hubs 96 in the opposite direction or into engagement with the hubs 97 so that upon the return movement of the carriage the rollers 94 are spread apart by the action of the cam track, and through the action of the toggles 91 and 92 the brushes 87 are also spread apart out of engagement with the shoe, during the movement of the brushes from the heel toward the toe of the shoe. Springs 98' are provided simply to hold the rollers 94' in contact with the track 95 when the hubs 96 and 97 are uncoupled.

To properly position the shoe upon the foot rest and to prevent displacement thereof and also to prevent the application of dressing where it is not required or desired a shield 100 is mounted upon a vertically reciprocatable shaft 101 which said shaft is connected with a lever 102 pivoted at 103 to the casing and carrying a roller 104 at its end opposite its connection with the shaft 101. Pivoted adjacent the lever 102 is a lever 105 having one end disposed adjacent a slot 106, and by means of the lever 105 the lever 102 may be manipulated. Connected with the lever 105 at the end opposite the slot 106 is a chain or cable 107 passing about a pulley 108 and a second pulley 109 is attached to a weight 110 in such manner that the chain 107 is under continual strain. Connected with the chain 107 is a lever 111 pivoted as at 112 to the housing and pivotally connected at its opposite end with a link 113 which in turn is pivotally connected with a frame 114 slidably mounted upon guide rods 115 and carrying a U-shaped positioning member 116 adapted to engage the rear side of a shoe or ankle of a foot to hold such shoe or foot firmly upon the shoe rest 117.

It will be apparent that the manipulation of the lever 105 from without the housing will serve to withdraw the U-shaped positioning member for the insertion of the foot and that the depression of such lever will also engage the roller 104 and raise the front shield 100. The releasing of the lever 105 will permit the front shield to descend and engage the front of the foot while the weight 110 will serve to move the U-shaped positioning member forward to also engage the rear of the foot so that by the employment of such two members the foot or shoe is accurately positioned upon the shoe support and the front positioning member serves also as a shield to prevent the application of dressing to the front or top of the shoe.

The mechanism above described is operated from any approved source of energy as the motor 38 and such motor is controlled by the employment of a push button switch indicated at Figs. 17 and 18. The switch referred to comprises a bracket 117 rigidly secured to the interior of the casing with a slidable rod 118 extending outwardly through the casing and provided with a push button 119 upon the exterior thereof adjacent to the handle member 120 by which the lever 105 is manipulated.

Pivoted upon the bracket 117 is one blade 121 of the switch carrying one contact member 122 in position for engagement with the other contact member 123 carried rigidly by the bracket 117. To give the required instantaneous action to the switch a block 124 is mounted upon the spindle 118 and connected with the bell crank lever 125 also pivoted upon the bracket 117 and carrying a spring 126 which is adapted to draw across the pivot of the pivoted blade 121 so that when the push button is moved either inwardly or outwardly the first movement does not affect the switch but the switch is affected and moved forward after the spring 126 has passed beyond the pivot thus insuring instantaneous opening and closing of the switch to prevent sparking. The bell crank lever 125 is also controlled by the rod 127 which extends downwardly to the timing mechanism so that the switch may be both manually and mechanically operated.

Mounted also in position to be seen by the person being operated upon is a sight opening 128 with a card or sign 129 carried upon a lever 130 pivoted as at 131 to the casing and controlled by means of a rod 132 also extending downwardly to the timing mechanism and operated thereby. Connected also with the lever 130 is a link 133 connected with any approved form of registering or recording means 134 showing the number of operations of the mechanism.

The timing mechanism comprises a shaft 135 provided with a plurality of cams and a plurality of levers 136, 137, 138 and 139 are pivoted upon a common pivot 140 and in engagement with the cams upon the shaft 135. The shaft 135 is moved with a step by step movement by means of a lever 141 in position to be engaged by abutments 142 and 143 carried by the carriage 28 so that as the carriage 28 reciprocates the abutments 142 and 143 alternately engage the lever 141 upon opposite sides and oscillate such lever alternately in opposite directions. The lever 141 carries a detent 144 engaging a ratchet wheel 145 upon the shaft 135 whereby when the lever is oscillated the shaft 135 and the cams carried thereby are rotated with a step by step movement and the levers 136 to 139 inclusive receive actuating impulses therefrom.

The mechanism associated with the lever 141 is similar to that disclosed in co-pending application Serial No. 604409 filed on January 24, 1911, and renewed on December 22, 1915, Serial No. 68296, and comprises springs 146 adapted to move such lever across the dead center represented by its pivot and a rod 147 connecting said lever with a piston 148 located in a cylinder 149 serving as a dash-pot to cushion the movements of the lever 141 and prevent the same from jarring and pounding its limiting screws 150 and 151 when moved across its pivot under the impulse of the springs 146.

The rod 132 bearing the sign is connected with one of the levers as 138 while the rod 127 which actuates the switch is connected with another of said levers as 136. One of the levers as 139 is connected with the rod 152 which controls mechanism for applying dressing to the top of the shoe by rocking the rod 153 such delivering mechanism being shown at 154 and described more fully in said co-pending application filed on even date herewith. The other of said levers as 137 is connected with the rod 155 which rocks a shaft 156 which in turn moves a link 157 and actuates the coin-retaining means 158 of the coin-controlled device which is not herein claimed but which forms the subject-matter of another application.

By the employment of the timing mechanism just above described it will be apparent that the several functions of the apparatus are controlled from the single shaft forming a part of such timing mechanism that is to say, the operation of the switch, the operation of the coin-controlled device, the operation of the fluid-delivering means, and the operation of the sign or warning are all simultaneously controlled by independent cams mounted upon a common shaft and having a common step by step drive.

It is believed that the operation and function of the several parts, combinations and mechanism making up the organized structure which enters into the present application will be fully and clearly understood from the description of the parts and that a further and more extensive description of such functions and operations will not be necessary to a full and complete understanding thereof.

I claim:

1. In a shoe dressing machine, reciprocating carriages, spring pressed detents carried by the carriages adapted for interlocking, means for actuating one of the detents for unlocking at each reciprocation and other means for actuating the other detent for unlocking at the completion of a predetermined cycle of reciprocations.

2. In a shoe dressing machine, reciprocating carriages, means to move the carriages independently of each other, spring pressed detents carried by the carriages adapted to interlock, means adapted to engage one of the detents for unlocking at each reciprocation and means for engaging the other detent for unlocking at the completion of a predetermined cycle of reciprocations.

3. In a shoe dressing machine, reciprocating carriages, spring pressed hooked detents carried by the carriages and adapted for interlocking, means for engaging one of the detents and moving it to unlocking position against the tension of the spring at each reciprocation of the carriage and means for engaging the other detent and moving it to unlocking position against the tension of its spring at the end of a predetermined cycle of reciprocations.

4. In a shoe dressing machine, reciprocating carriages, a lock composed of sections one carried by each carriage, means for actuating one section of the lock and moving it into unlocking position at each reciprocation of the carriages and means for engaging the other member of said lock and moving it to unlocking position at the end of a predetermined cycle of reciprocations.

5. In a shoe dressing machine, a reciprocating carriage, a brush-carrying frame mounted for rotation upon the carriage, a worm carried by the carriage and connected with the frame, a pillar erected adjacent the path of movement of the carriage and rollers carried by the pillar adapted for engagement with and to rotate the worm.

6. In a shoe dressing machine, a reciprocating carriage, a brush-carrying frame mounted for rotation upon the carriage, a shaft journaled upon the frame and connected with and to rotate the frame, helical fins formed upon the shaft and rollers mounted upon a stationary bearing adapted for engagement with the tops of opposite fins.

7. In a shoe dressing machine, a carriage mounted to reciprocate, a brush-carrying frame journaled upon the carriage, a shaft journaled adjacent the frame and carried by the carriage, means connecting the shaft with the frame, means permitting the shaft to rotate freely without moving the frame at times, fins formed about the shaft and rollers mounted upon a stationary bearing adopted to engage the fins and impart a rotary motion to the shaft.

8. In a shoe dressing machine, a reciprocating carriage, a brush-carrying frame mounted to rotate upon the carriage, a shaft journaled upon the carriage adjacent the frame, a sprocket wheel carried by the shaft, a sprocket chain connecting such wheel with and to rotate the frame, a clutch connecting the sprocket wheel and the shaft whereby the shaft is free to rotate in one direction, a helical fin formed about the shaft and means for engaging the helical fin and imparting a rotary motion to the shaft alternately in opposite directions.

9. In a shoe dressing machine, a reciprocating carriage, a brush-carrying frame mounted to rotate upon the carriage, a shaft journaled on the carriage adjacent the frame, means connecting the shaft and frame whereby the shaft is free to rotate in one direction but when rotated in the opposite direction to rotate the frame, helical fins formed about the shaft and rollers mounted upon a stationary abutment positioned to bear upon the tops of the fins and to impart rotary motion to the shaft alternately in opposite directions.

10. In a shoe dressing machine, a reciprocating carriage, brushes carried by the carriage and mounted to oscillate toward and away from each other, means to hold the brushes yieldingly toward each other, a track mounted adjacent the carriage, members mounted to move upon the track and means carried by the track for engaging said members to move the brushes away from each other.

11. In a shoe dressing machine, a reciprocating carriage, shafts carried by the carriage, normally substantially vertical, means to rotate the shafts, brushes carried by the shafts, means to hold the shafts and brushes yieldingly toward each other, a track serving as a cam, means carried by the track for at times forcing the brushes apart and means for disconnecting the spreading devices to permit the carriage to move without spreading the brushes.

12. In a shoe dressing machine, a reciprocating carriage, a cam mounted adjacent the carriage, brushes extending upwardly from the carriage and mounted to oscillate transversely to the path of movement of the carriage, a lever mounted for engagement with the cam, links connecting the lever with and to move the brushes away from each other and means to disconnect the levers from the connecting means at times.

13. In a shoe dressing machine, a reciprocating carriage, brushes extending upwardly from the carriage and mounted to oscillate in a direction transverse to the line of movement of the carriage, a cam mounted between the brushes, levers mounted for engagement with the cam, links connecting the levers with and to move the brushes apart, means at one limit of reciprocation of the carriage for disconnecting the levers and the links and means at the other limit of reciprocation of the carriage for connecting such lever and links.

14. In a shoe dressing machine, a reciprocating carriage, brushes carried by the carriage and adapted for movement toward and away from each other, means to hold the brushes yieldingly toward each other, spaced shafts carried by the carriage, links rigidly connected to the shafts and with the brushes, levers carried by the shafts, clutches adapted to connect the levers with the shafts, cams mounted to oscillate the levers with the shafts as centers and means at the opposite limits of reciprocation of the carriage for alternately connecting and disconnecting the clutches.

In testimony whereof I affix my signature in presence of two witnesses.

CHARLES F. BURKHART.

Witnesses:
BELLE B. FRAME,
LILLIAN B. PARSONS.